(12) United States Patent
Van Der Plaats et al.

(10) Patent No.: US 8,220,833 B2
(45) Date of Patent: Jul. 17, 2012

(54) ROTATIONAL BREAKAWAY TRAILER JACK ASSEMBLY AND METHOD OF USE

(75) Inventors: Billy J. Van Der Plaats, Sheldon, IA (US); Boyd K. Steenblock, Orange City, IA (US)

(73) Assignee: Dethmers Manufacturing Company, Boyden, IA (US)

( * ) Notice: Subject to any disclaimer, the term of this patent is extended or adjusted under 35 U.S.C. 154(b) by 648 days.

(21) Appl. No.: 12/352,939

(22) Filed: Jan. 13, 2009

(65) Prior Publication Data

US 2009/0179400 A1 Jul. 16, 2009

Related U.S. Application Data

(60) Provisional application No. 61/020,955, filed on Jan. 14, 2008.

(51) Int. Cl.
*B60S 9/04* (2006.01)

(52) U.S. Cl. .................... 280/763.1; 280/764.1

(58) Field of Classification Search ............... 280/163.1, 280/164.1, 165.1, 166.1, 763.1, 764.1, 765.1, 280/766.1
See application file for complete search history.

(56) References Cited

U.S. PATENT DOCUMENTS

| | | | |
|---|---|---|---|
| 1,119,767 A | 12/1914 | Steinhart | |
| 2,459,965 A | 1/1949 | Robertson | |
| 2,519,364 A * | 8/1950 | Fredholm | 254/424 |
| 2,540,677 A | 2/1951 | Kandt et al. | |
| 2,709,604 A | 5/1955 | Hartman | |
| 2,797,934 A | 7/1957 | Helgeson | |
| 2,976,055 A * | 3/1961 | Harrison | 280/763.1 |
| 3,093,362 A * | 6/1963 | Schaefer | 254/424 |
| 3,180,657 A | 4/1965 | Molter | |
| 3,223,435 A | 12/1965 | Yarbrough | |
| 3,250,548 A | 5/1966 | Boyd, | |
| 3,342,509 A | 9/1967 | Sancioni | |
| 3,414,294 A | 12/1968 | Moulton | |
| 3,667,730 A * | 6/1972 | Kollmar | 254/424 |
| 3,733,051 A * | 5/1973 | Bollinger | 254/94 |
| 4,162,798 A * | 7/1979 | Foley | 280/475 |
| 4,172,604 A * | 10/1979 | Bond et al. | 280/764.1 |
| 4,351,542 A | 9/1982 | Lovell et al. | |
| 4,635,904 A * | 1/1987 | Whittingham | 254/425 |
| 5,011,119 A | 4/1991 | Harrington | |
| 5,067,746 A * | 11/1991 | Baker | 280/763.1 |
| 5,240,273 A | 8/1993 | Stead et al. | |
| 5,282,605 A | 2/1994 | Sauber | |

(Continued)

FOREIGN PATENT DOCUMENTS

FR 2765772 A1 1/1999

*Primary Examiner* — Jeffrey J Restifo

(74) *Attorney, Agent, or Firm* — Brick Gentry PC; Brian J. Laurenzo

(57) ABSTRACT

A rotational jack assembly is provided to support a portion of a trailer. The jack assembly has a pivot mount with a pivot axis, a mounting plate rotatable about the pivot axis and a pin receptor with a first and second portion. The mounting plate carries a support assembly and a locking pin. The locking pin is engageable with the pin receptor, and adapted to move between the first and second portions of the pin receptor upon application of rotational force. A force activated locking assembly and a breakaway support assembly are also provided for supporting a portion of a trailer. A method of use for the rotational breakaway trailer jack assembly is also disclosed.

16 Claims, 6 Drawing Sheets

U.S. PATENT DOCUMENTS

| | | | | |
|---|---|---|---|---|
| 5,451,080 A | * | 9/1995 | Kneile | 248/354.1 |
| 5,711,504 A | * | 1/1998 | Cusimano | 248/354.3 |
| 6,141,997 A | * | 11/2000 | Blehi, III | 70/56 |
| 6,511,279 B1 | * | 1/2003 | Harkcom et al. | 414/537 |
| 6,779,808 B2 | | 8/2004 | Connor | |
| 6,846,016 B2 | * | 1/2005 | VanDenberg et al. | 280/763.1 |
| 7,150,472 B1 | * | 12/2006 | Schneider | 280/766.1 |
| 7,654,570 B2 | * | 2/2010 | Giralde | 280/766.1 |
| 2003/0067142 A1 | | 4/2003 | Newkirk | |
| 2004/0227326 A1 | | 11/2004 | Peters | |
| 2007/0040369 A1 | * | 2/2007 | Lotman | 280/763.1 |

* cited by examiner

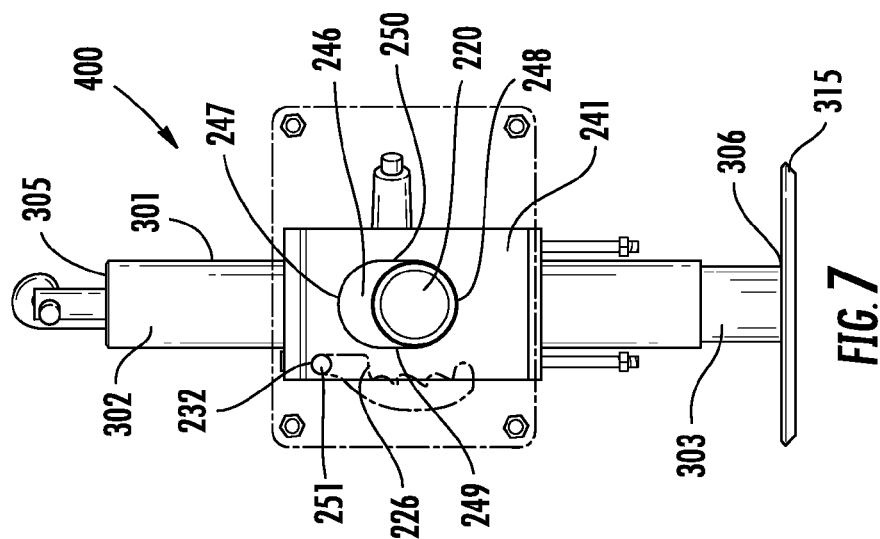
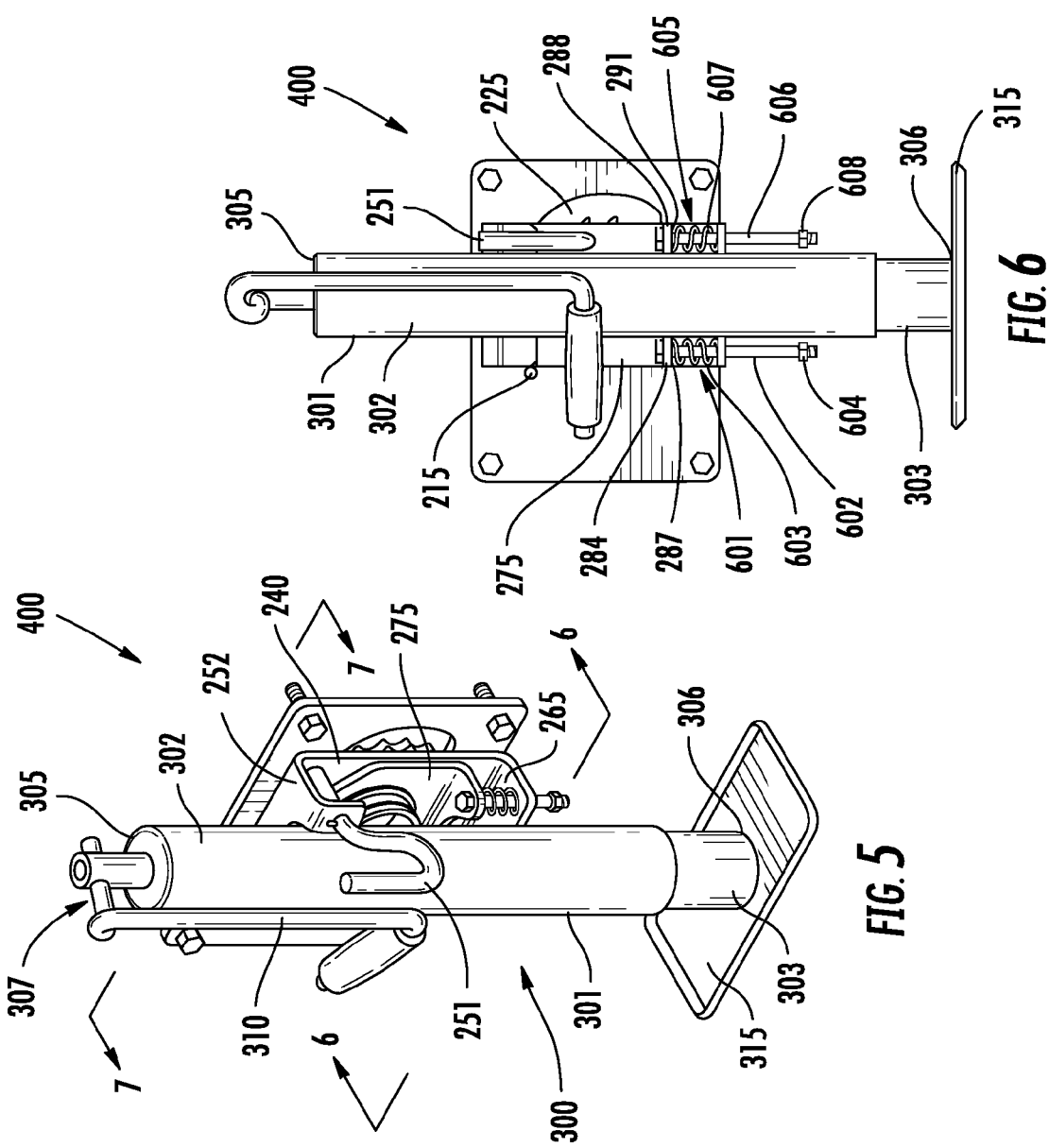
FIG. 7
FIG. 6
FIG. 5

ROTATIONAL BREAKAWAY TRAILER JACK ASSEMBLY AND METHOD OF USE

CROSS-REFERENCE TO RELATED APPLICATIONS

This application claims priority from U.S. Provisional Application Ser. No. 61/020,955, filed Jan. 14, 2008, entitled ROTATIONAL BREAKAWAY TRAILER JACK ASSEMBLY AND METHOD OF USE, the contents of which is hereby incorporated in its entirety by reference.

FIELD OF THE INVENTION

The present invention generally relates to devices used to support a trailer. More specifically, the present invention relates to a trailer jack assembly.

BACKGROUND

Jacks for use in supporting portions of a trailer are well known. Jacks are often located in the front portion of the trailer which receives a trailer hitch from a towing vehicle. Typically, the jack includes a wheel or foot at its ground engaging end and a crank device at a second, opposite end. The crank device operates to raise and lower the wheel or foot, often through a telescoping support member arrangement.

These jacks may also include a device for permitting the jack to be rotated or pivoted from a vertical position to a horizontal position, ideal for storage once the trailer is connected to the towing vehicle. These pivot devices often include jack mounts which rely on a manually actuated pin to lock the jack in the vertical, support position. Failure to engage the pin can cause the jack to become unstable, especially when the attached trailer bears a load. Once engaged in the vertical, support position, to rotate the jack into the horizontal, storage position, the pin must be manually actuated or disengaged to allow the jack to rotate up and out of the way.

Failure to actuate or disengage the pin results in the jack remaining in the vertical, support position. Operation of the towing vehicle with the jack in this position can result in damage to the jack or jack assembly upon contact with an obstacle. The resulting damage may include bending or shearing of the pin used to lock the jack in the vertical position. Moreover, once the pin is bent or sheared, the jack will often "skip" along the ground, causing additional damage to the jack and/or ground engaging end. Additional damage to the jack or jack assembly can include deformation and even irreparable structural damage.

Accordingly, a jack and/or a mounting assembly for a jack is provided which is operable to support the trailer, is easily moved between a vertical, support position and a non-vertical or horizontal, storage position, and which is capable of break away pivotal movement to avoid structural damage upon contact with an obstacle.

SUMMARY

The present invention provides a jack assembly to support a portion of a trailer, such that the jack assembly has a pivot mount having a pivot axis, a mounting plate rotatable about the pivot axis, a support assembly carried by the mounting plate, a pin receptor having a first and second portion, and a locking pin carried by the mounting plate, engagable with the pin receptor, and adapted to move from the first portion to the second portion of the pin receptor upon application of rotational force.

The present invention also provides a support assembly to support a portion of a trailer with a force or weight activated locking assembly. The locking assembly includes a pin receptor with an upper stop, lower stop and locking recess, a mounting plate, a jack assembly in communication with the mounting plate, a spring push plate in communication with the mounting plate by a biasing member, and a pin in communication with the mounting plate and removably received by the pin receptor.

The present invention also provides for a rotatable, force activated locking jack assembly, the jack assembly including a mounting assembly having a back plate with a pivot mount and a ratcheted pin receptor, a mounting plate with a first wall having a generally oblong aperture and arranged in a generally perpendicular plane to a second wall, a spring push plate with a first wall having an aperture and arranged in a generally perpendicular plane to a second wall, and a biasing member operably connecting the mounting plate and spring push plate. The jack assembly also includes an adjustable support assembly having a telescoping assembly connected to either the mounting plate or the spring push plate and a pin slidably connected to the mounting plate. Further, the jack assembly includes a pivot assembly where the mounting plate first wall aperture and the spring push plate first wall aperture are rotatably connected to the pivot mount and the pin is removably received by the ratcheted pin receptor.

One or more embodiments of the present invention result in advantages not provided by jack assemblies known in the art. Specifically, the jack assembly may be easily pivoted to a horizontal, storage position by simple rotation of the assembly. In addition, when the jack is in the vertical, support position, and is supporting the weight of a portion of a trailer, the jack automatically locks against pivotal movement by the weight of the load bearing on the trailer. Moreover, if the jack is left in the vertical, support position after the trailer is connected to a tow vehicle, the jack assembly will pivot up and out of the way upon contact with an obstacle, resulting in no damage to the pin, jack, jack assembly, or trailer. The jack will also remain pivoted up and out of the way so not to freely swing below the trailer.

BRIEF DESCRIPTION OF THE DRAWINGS

FIG. 5 is an isometric view of a rotational breakaway trailer jack assembly according to the embodiment of FIG. 1, showing the jack assembly in a positive stop position, in which force has been applied so as to create a downward force toward the ground.

FIG. 6 is an elevation view of the jack assembly of FIG. 5, taken along line 6-6 of FIG. 5.

FIG. 7 is an elevation view of the jack assembly of FIG. 5, taken along line 7-7 of FIG. 5.

DETAILED DESCRIPTION

Figure 4:
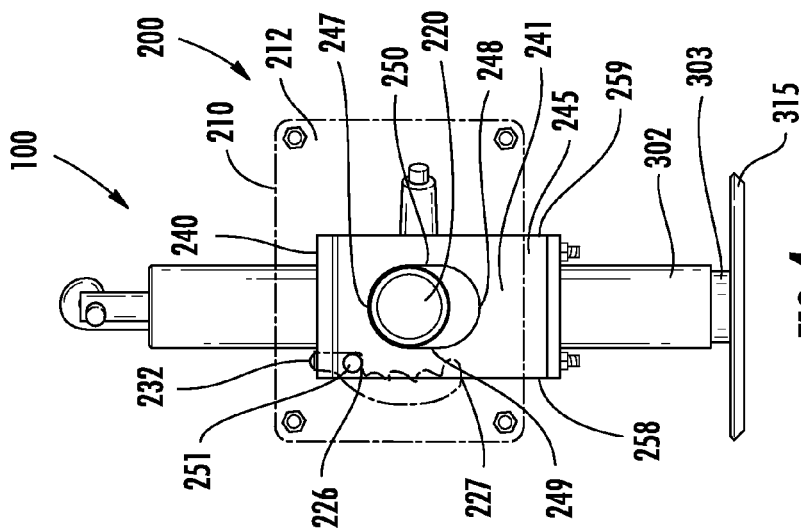
FIG. 4 is an elevation view of the rotational breakaway trailer jack assembly of FIG. 1, taken along line 4-4 of FIG. 1.

The following is a detailed description of certain one or more examples of embodiments of a jack assembly 100. For ease of discussion and understanding, the following detailed description and illustrations refer to the jack assembly 100 for use with a trailer and more specifically, to support a portion of a trailer. It should be appreciated that a "trailer" is provided for purposes of illustration and the jack assembly 100 may be mounted onto any other structure in which a mountable, rotatable, breakaway support is needed.

The jack assembly 100, according to the one or more examples of embodiments and referring to FIGS. 1-4, includes a mounting assembly 200 for attachment to a portion of a trailer, an adjustable support assembly or jack 300 for supporting a portion of a trailer on the ground and allowing for extension and retraction of the member engaging the ground. The jack assembly 100 also includes a force or weight activated locking assembly 400 of FIGS. 5-7 for locking of the adjustable support assembly or jack 300 with the mounting assembly 200 once force or weight is applied to the mounting assembly 200 through the attached trailer, and a pivot assembly 500 of FIGS. 11-16 for rotation of the adjustable support assembly or jack 300 about the mounting assembly 200 from a vertical position to a non-vertical position.

Referring to FIGS. 1-4, the mounting assembly 200 includes a back plate 210. While the back plate 210 is illustrated to be rectangular in shape, it is contemplated that the back plate 210 may be formed of any shape without departing from the overall scope of the present invention. The back plate 210 is generally formed from a material of sufficient strength to support a trailer and the associated force or weight of a load thereon, as well as to withstand stresses placed upon the jack assembly 100 thereby. To this end, back plate 210 may be formed of metal or a composite material.

The back plate 210 of FIGS. 1-4 has a first side 211 and a second side 212. In one or more examples of embodiments, the first side 211 of the back plate 210 is located at a position closer to the support assembly or jack 300 than the second side 212 of the back plate 210. The second side 212 of the back plate 210 is generally located at a position closer to the trailer in which the jack assembly 100 is attached. The back plate 210 may have a small thickness between the first side 211 and the second side 212.

Figure 2:
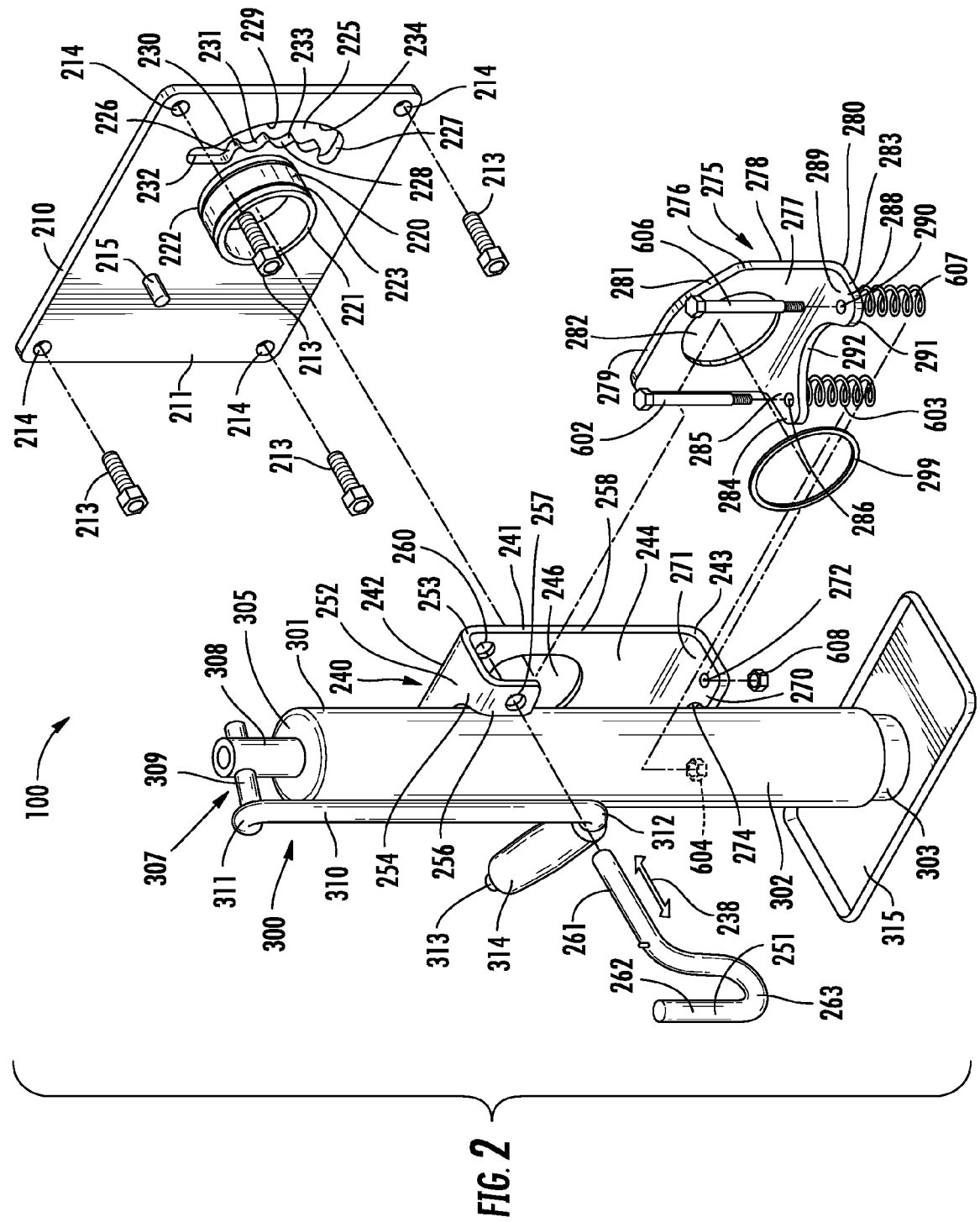
FIG. 2 is an exploded view of the rotational breakaway trailer jack assembly of FIG. 1.
Figure 8:
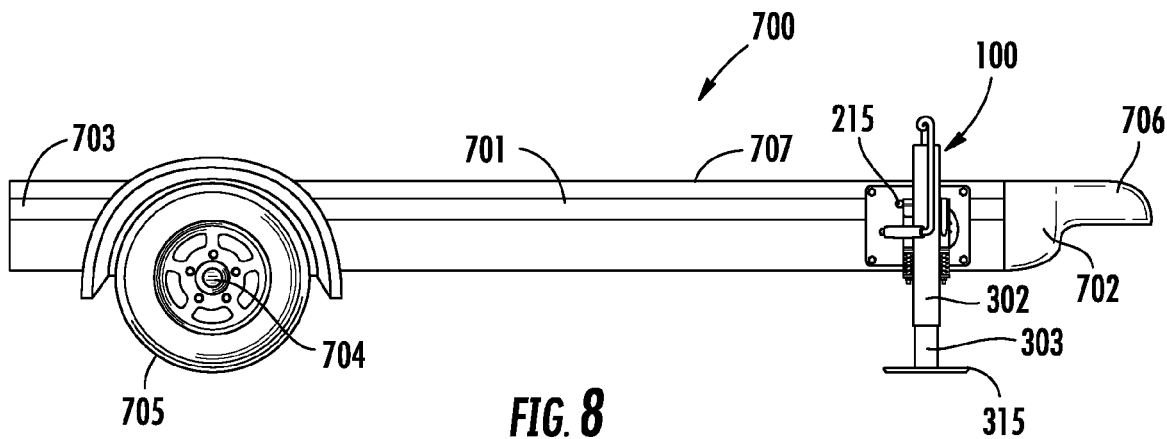
FIG. 8 is a side elevation view of a trailer including a rotational breakaway trailer jack assembly according to the embodiment of FIG. 1 installed thereon, in which the jack is in a vertical position.

The back plate 210 has structural elements to operably and securably attach the back plate to a trailer, and more specifically to a trailer frame 701, as shown in, for example, FIG. 8. As best illustrated in FIG. 2, the back plate 210 may have at least one threaded member 213 and at least one threaded member aperture 214. One or more examples of embodiments of the back plate 210 has a plurality of threaded members. For instance, in FIG. 2, four threaded members 213 are provided. The threaded members 213 may be removably received in four threaded member apertures 214. Each threaded member 213 may be removably received first through the first side 211 of the back plate 210, pass through the back plate 210, and exit the second side 212 of the back plate 210. Each threaded member 213 may then be removably received in the frame of a trailer (not shown) or in the alternative, received by a receiving plate which may surround a member of the trailer frame (not shown). The threaded members 213 may be locked into position. For example, a threaded member 213 may be a bolt, which may be locked into position by attaching a nut (not shown) onto the threaded end of the bolt. Alternative methods of locking the threaded member 213 may also be used without departing from the overall scope of the present invention. Locking the threaded members 213 results in the rigid or fixed mounting of the back plate 210 to the trailer or trailer frame. Other embodiments of the back plate 210 may include alternative methods of attachment to a trailer, and more specifically to a trailer frame. These alternative methods may include, but are not limited to, welding, riveting, and integrally incorporating the back plate 210 into the trailer frame.

The back plate 210 may also include a stop or block or extrusion 215. As best illustrated in FIG. 2, the stop or block or extrusion 215 may be positioned on the first side 211 of the back plate 210. The stop or block or extrusion 215 may be integrally formed with back plate 210. One or more examples of embodiments of the stop or block or extrusion 215 may include alternative methods of attachment to the back plate 210, which may include, but are not limited to, welding, riveting, and bolting. In addition, in one or more examples of embodiments, the stop or block or extrusion 215 may be formed separately from the back plate 210. The stop or block or extrusion 215 may be formed of similar materials as the back plate 210.

Figures 12, 13:
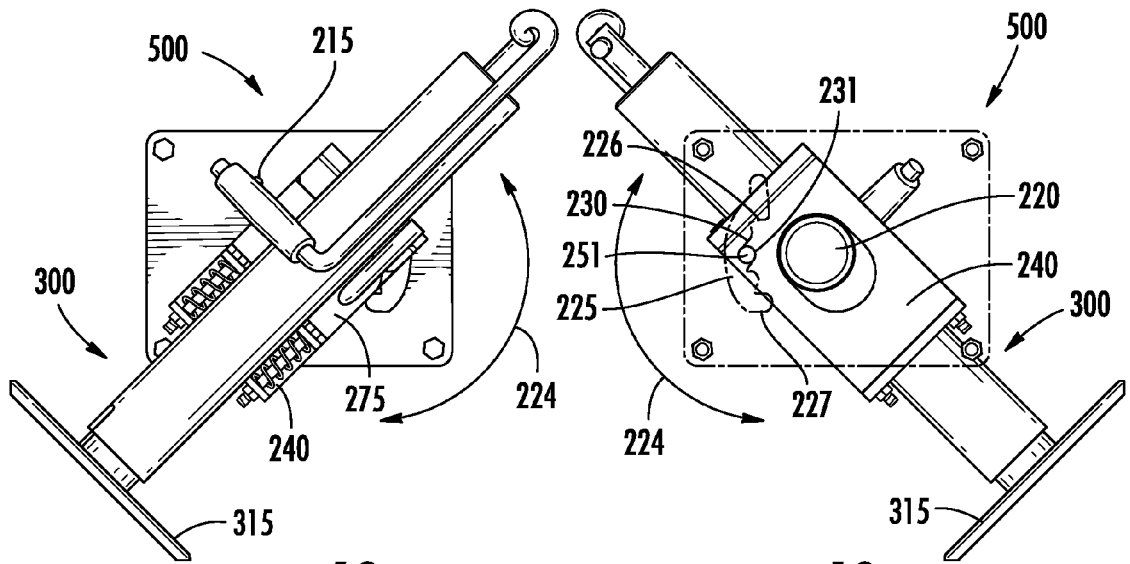
FIG. 12 is an elevation view of the rotational breakaway trailer jack assembly of FIG. 11, taken along line 12-12 of FIG. 11.
FIG. 13 is an elevation view of the rotational breakaway trailer jack assembly of FIG. 11, taken along line 13-13 of FIG. 11.

The back plate 210 also may include a pivot mount 220. As illustrated in FIG. 2, the pivot mount 220 may be formed by a generally cylindrical protrusion extending a distance away from the first side 211 of the back plate 210. The pivot mount 220 has a first end 221 and a second end 222. The first end 221 of the pivot mount 220 is located at a distance away from the first side 211 of the back plate 210. The second end 222 of the pivot mount 220 is located at or near the back plate 210. The pivot mount 220 may have an annular groove 223, generally located between the first end 221 and second end 222 of the pivot mount 220. The pivot mount 220 has a length extending from the first side 211 of the back plate 210 sufficient to permit engagement with an adjacent member of the mounting assembly 200. As shown in FIGS. 12-13, the pivot mount 220 may have a pivot or rotation axis 224 to permit pivotal or rotational movement of the adjustable support assembly or jack 300 about the pivot mount 220. The pivot mount 220 shown in FIGS. 1-7 has a hollow core, however the pivot mount 220 may be solid. Further, the pivot mount 220 shown in FIG. 2 is integrally formed with the back plate 210. However, it is contemplated that the pivot mount 220 may be formed separately from the back plate 210 and attached thereto. In addition, the pivot mount 220 may optionally include an aperture extending entirely through the back plate 210. The pivot mount 220 is generally formed from a material of sufficient strength to support a trailer and the associated force or weight of a load thereon, as well as to withstand stresses placed upon the jack assembly 100 thereby. To this end, pivot mount 220 may be formed of metal or a composite material.

The back plate 210 further may include a pin receptor 225. As illustrated in FIG. 2, the pin receptor 225 may have a generally arcuate shape and may have an upper stop or first portion 226 and a lower stop or second portion 227. Located above the upper stop or first portion 226 may be an upwardly extending locking valley or recess or positive stop 232. In other examples of embodiments the locking valley or recess or positive stop 232 may be located below or near the lower stop or second portion 227, may be below or near the upper stop or first portion 226, or may be at another suitable location along the pin receptor 225. The pin receptor 225 also may have an inner wall 228 and an outer wall 229. Located on the inner wall 228 may be one or more protrusions 230 and one or more valleys 231. The protrusions 230 and valleys 231 provide for a ratcheted surface on the inner wall 228 of the pin receptor 225. The surface 233 of each protrusion 230 and valley 231 is generally smooth to allow for the sliding movement of a pin or locking pin 251 across the outer surface 233. The outer wall 229 of the pin receptor 225 may also have a generally smooth surface 234 to allow for the sliding movement of the pin or locking pin 251 across the surface. The pin receptor 225 of the illustrated embodiment may be integrally formed by hollowing out a portion of the back plate 210. However, in one or more examples of embodiments, the pin receptor 225 may be formed separately from the back plate 210 or may be formed by a protrusion surrounding the outer perimeter of the pin receptor 225.

The mounting assembly 200 may also include a mounting plate 240. As shown in FIGS. 1-4, the mounting plate 240 may have a top portion 242, a bottom portion 243, a first side 244 and a second side 245. The mounting plate 240 may further have a mounting wall 241 positioned between the top portion 242 and bottom portion 243. The mounting wall 241 may have a first side portion 258, a second side portion 259 and an aperture 246. The aperture 246 may be oval or oblong in shape, having a top or first arcuate end 247, a bottom or second arcuate end 248, a first sidewall 249 and a second sidewall 250. Preferably, the aperture 246 of the mounting wall 241 removably receives the pivot mount 220, such that the back plate 210 may be positioned on the second side 245 of the mounting plate 240. The aperture 246 top or first arcuate end 247 and bottom or second arcuate end 248 may include a radius of curvature corresponding to the radius of the pivot mount 220. The first sidewall 249 and second sidewall 250 of the aperture 246 may connect the top or first arcuate end 247 with the bottom or second arcuate end 248, permitting the pivot mount 220 to slide between the top or first arcuate end 247 and the bottom or second arcuate end 248. In one or more examples of embodiments, the mounting plate 240 is generally formed of similar material as the back plate 210.

Figure 1:
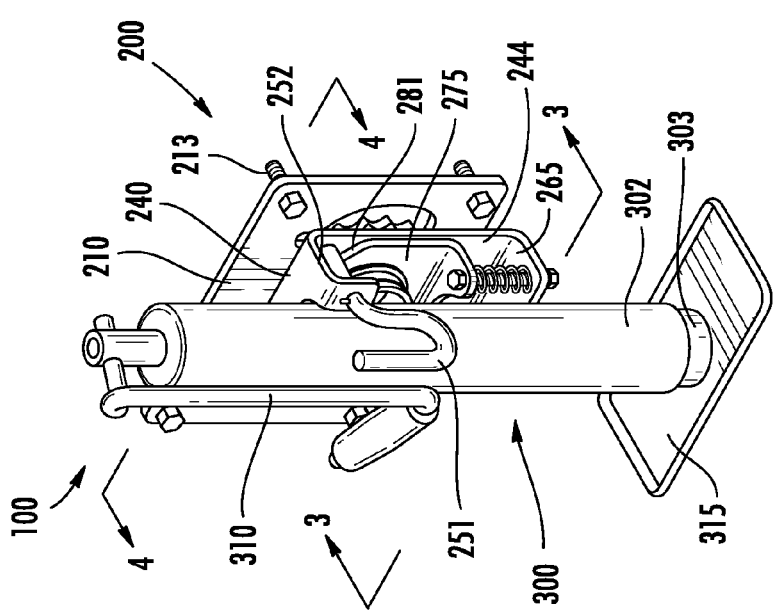
FIG. 1 is an isometric view according to one or more examples of embodiments of a rotational breakaway trailer jack assembly, showing the jack assembly in a neutral rest position, absent the application of downward force.

Mounting plate 240 may also include an operably engaged pin or locking pin 251. In one or more examples of embodiments, the mounting plate 240 may carry the pin 251 through an attached pin mount 252. As shown in FIGS. 1, 2 and 5, the pin mount 252 may be integrally formed with the mounting wall 241. The pin mount 252 shown in FIG. 2 may permit sliding movement of pin 251 in a generally perpendicular plane or axis 238 to the mounting plate 240 mounting wall 241 and back plate 210. The pin mount 252 may include a wall portion 253 having a width which corresponds to the width of the mounting wall 241. The wall portion 253 may include a first side 254 (shown in FIG. 2) and second side 255 (not shown). The pin mount 252 may be positioned at the top portion 242 of mounting plate 240 and extend outward from the first side 244 of the mounting wall 241. Pin mount 252 may form an arm 256 extending from the first side 254 toward and away from the second side 255 (not shown) of the wall portion 253. The arm 256 may have an aperture 257 for removably receiving pin 251. The aperture 257 may have a diameter corresponding to pin 251 to permit sliding and pivotal movement of pin 251. The mounting wall 241 may also include a second aperture 260 in mounting plate 240 a distance away from aperture 257 of the pin mount 252. Second aperture 260 generally may be aligned with aperture 257 to removably receive pin 251. Pin mount 252 may also include a biasing member (not shown) for biasing the pin 251 toward an engaged position with the pin receptor 225. The pin mount 252 may be positioned toward the first side portion 258 of the mounting wall 241 to avoid interference with the adjustable support assembly or jack 300. However, it is contemplated that pin mount 252 may be positioned toward the second side portion 259 of the mounting wall 241, or attached at other locations on mounting plate 240. Additionally, pin mount 252 may be attached by other means suitable to support operation of pin 251, including, but not limited to weld and attachment by bolt and nut.

As illustrated in FIGS. 1, 2 and 5, the pin mount 252 may operably receive and carry pin 251. In one or more examples of embodiments, and referring to FIG. 2, pin 251 may include a longitudinally extending arm 261 and a handle 262 at one end. The handle 262 may include an arcuate portion 263 which may prevent over-insertion of pin 251 into the aperture 257 of pin mount 252 or allow for grasping of pin 251 by a user. The longitudinally extending arm 261 of pin 251 may have a length which, when fully inserted, may extend through aperture 257 of pin mount 252, through the second aperture 260 of mounting wall 241, and engage the pin receptor 225 in back plate 210. Pin 251 may be cylindrical in shape to slidably and rotatably fit into aperture 257, second aperture 260 and pin receptor 225. Further, pin 251 may be formed of a similar material as back plate 210 and mounting plate 240.

Figure 3:
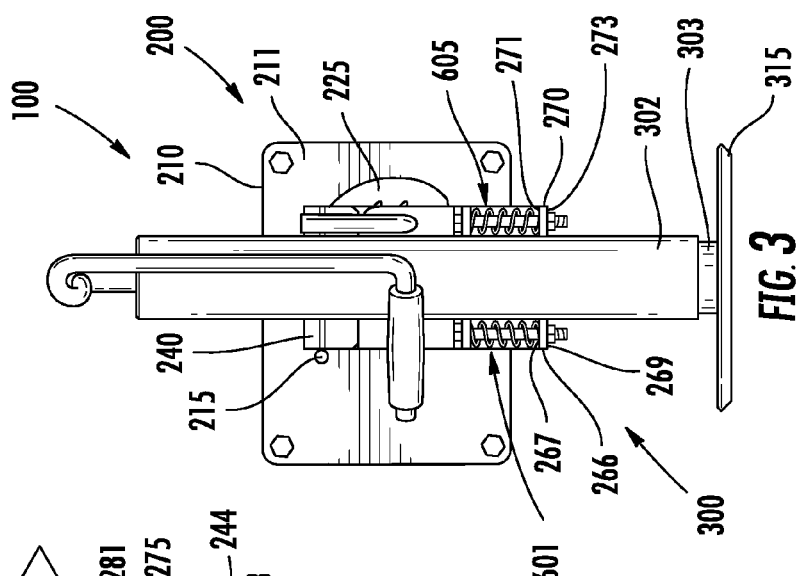
FIG. 3 is an elevation view of the rotational breakaway trailer jack assembly of FIG. 1, taken along line 3-3 of FIG. 1.

Mounting plate 240 may also include a spring plate arm 265. As illustrated in FIGS. 1-5, spring plate arm 265 may be integrally formed at the bottom portion 243 of the mounting wall 241. The spring plate arm 265 may extend in a generally perpendicular plane outward from the first side 244 of the mounting wall 241 and may have a width which corresponds to the width of the mounting wall 241. Referring to FIGS. 2 and 3, spring plate arm 265 may also include a first spring support portion 266 and a second spring support portion 270. The first spring support portion 266 and second spring support portion 270 each may have an upper surface 267, 271, an aperture or orifice 268, 272, and a lower spring securement surface 269, 273. In one or more examples of embodiments, the spring plate arm 265 may include a centrally cut out recess 274 shaped to receive one or more support members of the adjustable support assembly or jack 300. Both the first spring support portion 266 and second spring support portion 270 may be integrally connected in the spring plate arm 265 by the centrally cut out recess 274. In one or more examples of embodiments, the first spring support portion 266 and second spring support portion 270 may be separated, or the spring plate arm 265 may only have a single spring support portion 266 or 270. Spring plate arm 265 preferably may be formed of a similar material as back plate 210 and mounting plate 240.

A spring push plate 275 may be operably attached to the mounting plate 240 at the upper surface 267, 271 of the spring plate arm 265 and may be pivotally attached to the pivot mount 220 on the first side 244 of the mounting wall 241. As best illustrated in FIG. 2, spring push plate 275 may be formed by a pivot wall 276 in a first plane and a spring mounting wall 283 in a second plane. Spring push plate 275 preferably may be formed of a similar material as back plate 210 and mounting plate 240. The pivot wall 276 is generally rectangular in shape having a first side 277, a second side 278, a top portion 279 and a bottom portion 280, although alternative geometries would not depart from the overall scope of the present invention. The top portion 279 of the pivot wall 276 may include an arcuate or angled portion 281 located on the second side 255 of the pin mount 252, generally below the pin 251 and pin mount 252 as shown in FIG. 1. The pivot wall 276 of FIG. 2 may include a pivot mount receptor or aperture 282 for removably receiving the pivot mount 220. The pivot mount receptor or aperture 282 may have a radius of curvature corresponding to the radius of the pivot mount 220, enabling rotation of the spring push plate 275 about the pivot mount 220. Once the pivot mount 220 is received by the centrally located pivot mount receptor or aperture 282 of pivot wall 276, the second side 278 of pivot wall 276 generally faces the first side 244 of the mounting wall 241.

Spring push plate 275 of FIG. 2 may be removably secured to the pivot mount 220 by snap ring 299. The annular groove 223 of pivot mount 220 may be adapted to removably receive snap ring 299. In one or more examples of embodiments, snap ring 299 may be an annular ring formed of an elastic material, such as rubber. However, it is contemplated that snap ring 299 may be formed of any material suitable for securing spring push plate 275 to pivot mount 220. Further, alternative methods of connecting spring push plate 275 and pivot mount 220 may also be used without departing from the overall scope of the present invention. Snap ring 299 may be sized to fit within the annular groove 223 of pivot mount 220 while having a thickness which, when positioned in the annular groove 223, increases the thickness of the pivot mount to a diameter greater than the diameter of the aperture 246 of the mounting wall 241 and the diameter of the pivot mount receptor or aperture 282 of the pivot wall 276, preventing removal of the mounting plate 240 and spring push plate 275 from the pivot mount 220.

The bottom portion 280 of pivot wall 276 may include spring mounting wall 283. In one or more examples of embodiments, and shown in FIGS. 2 and 3, the spring mounting wall 283 of spring push plate 275 may be integrally formed at the bottom portion 280 of the pivot wall 276 and has a width which corresponds to the width of the pivot wall 276. The spring mounting wall 283 may extend in a generally perpendicular plane outward from the first side 277 of the pivot wall 276. Spring mounting wall 283 may include a first biasing mount 284 and a second biasing mount 288. As shown in FIGS. 2 and 6, the first biasing mount 284 and second biasing mount 288 each may have an upper surface 285, 289, an aperture or orifice 286, 290, and a lower surface 287, 291.

As shown in FIG. 2, in one or more examples of embodiments, the spring mounting wall 283 may include a centrally cut out recess 292 shaped to receive one or more support members of the adjustable support assembly or jack 300. Both the first biasing mount 284 and second biasing mount 288 may be integrally connected in the spring mounting wall 283 by the centrally cut out recess 292. In one or more examples of embodiments, the first biasing mount 284 and second biasing mount 288 may be separated, or the spring mounting wall 283 may only have a single biasing mount 284 or 288. Spring mounting wall 283 may be formed of a similar material as back plate 210 and mounting plate 240.

The spring push plate 275 may be operably attached to the mounting plate 240 by a first biasing attachment device or fastener 601 through the first biasing mount 284 and a second biasing attachment device or fastener 605 through the second biasing mount 288 of the spring mounting wall 283. As illustrated in FIGS. 2 and 6, the first and second biasing mounts 284, 288 may respectively receive the first and second biasing attachment device or fasteners 601, 605 through the apertures 286, 290. Each biasing attachment device or fasteners 601, 605 may respectively include a first and second fastener or bolt 602, 606, a first and second biasing member or resilient element 603, 607, and a first and second mating element or nut 604, 608. In one or more examples of embodiments, the first and second biasing attachment devices or fasteners 601, 605 may include any combination of biasing and attachment structure sufficient to provide resistance against movement of the spring push plate 275 in relation to the mounting plate 240. Further, additional or fewer biasing attachment devices or fasteners 601, 605 may be used for purposes of this invention. Each biasing attachment device or fasteners 601, 605 may be formed of a similar material as back plate 210 and mounting plate 240. However, it is contemplated that each biasing attachment device or fasteners 601, 605 may be formed of any material suitable for operably attaching and biasing spring push plate 275 to mounting plate 240.

The first biasing attachment device or fastener 601 of FIGS. 2 and 6 may have a first fastener or bolt 602 which may enter the first biasing mount 284 aperture or orifice 286 from the upper surface 285. As shown in FIG. 2, the aperture or orifice 286 may have a radius of sufficient size to removably receive first fastener or bolt 602 without allowing the first fastener or bolt 602 to completely pass through the aperture or orifice 286, allowing the head of first fastener or bolt 602 to rest on the upper surface 285 of first biasing mount 284. The lower surface 287 of the first biasing mount 284 may contact one end of first biasing member or resilient element 603, serving as resistance against the force of first biasing member or resilient element 603. The first biasing member or resilient element 603 may receive first fastener or bolt 602 on the lower surface 287 side of the first biasing mount 284. The first fastener or bolt 602 may pass entirely through the first biasing member or resilient element 603 and then may pass through the aperture or orifice 268 on the upper surface 267 side of the first spring support portion 266 of the spring plate arm 265 of the mounting plate 240. Aperture or orifice 268 may also have a radius of sufficient size to removably receive first fastener or bolt 602. The other end of first biasing member or resilient element 603 may rest upon the upper surface 267 of the first spring support portion 266 of the spring plate arm 265. In this position, the spring push plate 275 is adapted to push against the resistance of first biasing member or resilient element 603 toward the spring plate arm 265 when force or weight is applied. In the absence of force or weight, the first biasing member or resilient element 603 biases the spring push plate 275 away from the spring plate arm 265 until the pivot mount 220 contacts the top or first arcuate end 247 of the mounting plate 240 mounting wall 241 aperture 246. The first biasing member or resilient element 603 may be held in place by a first mating element or nut 604. The first mating element or nut 604 may attach to the first fastener or bolt 602 on the lower spring securement surface 269 of the first spring support portion 266 of the spring plate arm 265 of the mounting plate 240. The first biasing member or resilient element 603 may be a coil spring. However in one or more examples of embodiments, the first biasing member or resilient element 603 may be any biasing member or resilient element which provides resistance against movement of the spring push plate 275 in relation to the mounting plate 240.

Similarly, the second biasing attachment device or fastener 605 of FIGS. 2 and 6 may have a second fastener or bolt 606 which may enter the second biasing mount 288 aperture or orifice 290 from the upper surface 289. As shown in FIGS. 2, the aperture or orifice 290 may have a radius of sufficient size to removably receive second fastener or bolt 606 without allowing the second fastener or bolt 606 to completely pass through the aperture or orifice 290, allowing the head of second fastener or bolt 606 to rest on the upper surface 289 of second biasing mount 288. The lower surface 291 of the second biasing mount 288 may contact one end of second biasing member or resilient element 607, serving as resistance against the force of second biasing member or resilient element 607. The second biasing member or resilient element 607 may receive second fastener or bolt 606 on the lower surface 291 side of the second biasing mount 288. The second fastener or bolt 606 may pass entirely through the second biasing member or resilient element 607 and then may pass through the aperture or orifice 272 on the upper surface 271 side of the second spring support portion 270 of the spring plate arm 265 of the mounting plate 240. Aperture or orifice 272 may also has a radius of sufficient size to removably receive second fastener or bolt 606. The other end of second biasing member or resilient element 607 may rest upon the upper surface 271 of the second spring support portion 270 of the spring plate arm 265. In this position, the spring push plate 275 is adapted to push against the resistance of second biasing member or resilient element 607 toward the spring plate arm 265 when force or weight is applied. In the absence of force or weight, the second biasing member or resilient element 607 biases the spring push plate 275 away from the spring plate arm 265 until the pivot mount 220 contacts the top or first arcuate end 247 of the mounting plate 240 mounting wall 241 aperture 246. The second biasing member or resilient element 607 may be held in place by a second mating element or nut 608. The second mating element or nut 608 may attach to the second fastener or bolt 606 on the lower spring securement surface 273 of the second spring support portion 270 of the spring plate arm 265 of the mounting plate 240. The second biasing member or resilient element 607 may be a coil spring. However, in one or more examples of embodiments, the second biasing member or resilient element 607 may be any biasing member or resilient element which provides resistance against movement of the spring push plate 275 in relation to the mounting plate 240.

As illustrated in FIGS. 1, 2 and 5, the jack assembly 100 may include an adjustable support assembly or jack 300. In one or more examples of embodiments, the adjustable support assembly or jack 300 may attach to mounting plate 240 at the spring plate arm 265 allowing mounting plate 240 to carry the adjustable support assembly or jack 300. Further, in one of more examples of embodiments, the adjustable support assembly or jack 300 may attach to spring push plate 275 at the spring mounting wall 283 allowing spring push plate 275 to carry the adjustable support assembly or jack 300. Further, it should be appreciated that, in one or more examples of embodiments, attachment may be through the use of a fastener or the like, such as, for example, nuts and bolts, rivets, surface welds and/or any other known or later developed permanent or detachable fastening technology that provides sufficient strength to withstand normal wear and tear when using the jack assembly 100.

In one or more examples of embodiments, the adjustable support assembly or jack 300 of FIGS. 5-7 may be formed by a telescoping assembly 301. The telescoping assembly 301 may be cylindrical in shape, however, in one or more examples of embodiments, the telescoping assembly 301 may be of any suitable shape for support and operation of the adjustable support assembly or jack 300. The telescoping assembly 301 may have a first end 305 and a second end 306, and may include a first tubular member 302 and a second tubular member 303. The first tubular member 302 may have an inner diameter larger than the outer diameter of the second tubular member 303, enabling the first tubular member 302 to slidably receive the second tubular member 303 and enabling the second tubular member 303 to slide longitudinally within the first tubular member 302. It should be appreciated that, in one or more examples of embodiments, the second tubular member 303 may have an inner diameter larger than the outer diameter of the first tubular member 302, enabling the second tubular member 303 to slidably receive the first tubular member 302. The first and second tubular members 302, 303 may be made of any material capable of rigidly supporting the force or weight of at least a portion of a trailer and/or the weight or force or load thereon.

Within at least one of the first and second tubular members 302, 303 may be an adjustment element or structure (not shown). The adjustment element or structure may be any structural configuration, such as a gear structure, arranged to move the second tubular member 303 in relation to the first tubular member 302. In one or more examples of embodiments, the adjustment element or structure may be arranged to move the first tubular member 302 in relation to the second tubular member 303.

The adjustable support assembly or jack 300 may also include a control assembly 307. The control assembly 307 of FIG. 2 may be attached to the first end 305 of the telescoping assembly 301. In one or more examples of embodiments, the telescoping assembly 301 may carry the control assembly 307. The control assembly 307 may include a support connection member 308, a pivot axle 309 and a jack arm 310 to form a user operable adjustment device. The support connection member 308 may be located at the first end 305 of the telescoping assembly 301 and operably connected with the adjustment element or structure (not shown). Attached to the support connection member 308 is pivot axle 309, which is pivotable within the support connection member 308 and operates the adjustment element or structure.

As shown in FIG. 2, connected to the pivot axle 309 is the jack arm 310. The jack arm 310 may include a first end 311 and a second end 312. The first end 311 may connect the jack arm 310 to the pivot axle 309 to enable the pivot axle 309 to rotate and/or pivot. The second end 312 may carry a handle 313 for user operation of the control assembly 307. The handle 313 may include a grip portion 314 made of a material for user comfort and ease of use, such as, but not limited to, a foam or rubberized material.

The combination of pivot axle 309 and support connection member 308 enables responsive movement of the adjustment element or structure and, in turn, the telescoping assembly 301 when a user manipulates the control assembly 307 through the jack arm 310. Rotation of the jack arm 310 results in longitudinal or sliding movement of the second tubular member 303 relative to the first tubular member 302, increasing or decreasing the length of the telescoping assembly 301 (compare FIGS. 1-4 to 5-7). The length of the telescoping assembly 301 may be adjusted to raise and lower the portion of the trailer connected to the jack assembly 100. In one or more examples of embodiments, the control assembly 307 may be a user operable adjustment device. Further, in one or more examples of embodiments, the control assembly 307 may be automated, hydraulic, remote controlled or any other structure enabling telescopic operation of the telescoping assembly 301.

The adjustable support assembly or jack 300 may also include a ground engaging member 315. The ground engaging member 315 may be connected to the adjustable support assembly or jack 300 at the second end 306 of the telescoping assembly 301. In one or more examples of embodiments, the second tubular member 303 carries the ground engaging member 315, which has a surface area for engaging the ground. Further, in one or more examples of embodiments, the ground engaging member 315 may be a wheel, foot, or other similar structure for engaging the ground. In FIGS. 1-16, the ground engaging member is shown as a foot.

The mounting assembly 200 and adjustable support assembly or jack 300 together form the force or weight activated locking assembly 400. As illustrated in FIGS. 5-7, the force or weight activated locking assembly 400 may be formed by the arrangement of pin 251 within the pin receptor 225 and the arrangement of spring push plate 275 to mounting plate 240.

The mounting assembly 200 and adjustable support assembly or jack 300 together also form the pivot assembly 500. As illustrated in FIGS. 11-16, the pivot assembly 500 may be formed by the mounting of the spring push plate 275 and mounting plate 240 to the pivot mount 220.

Figure 9:
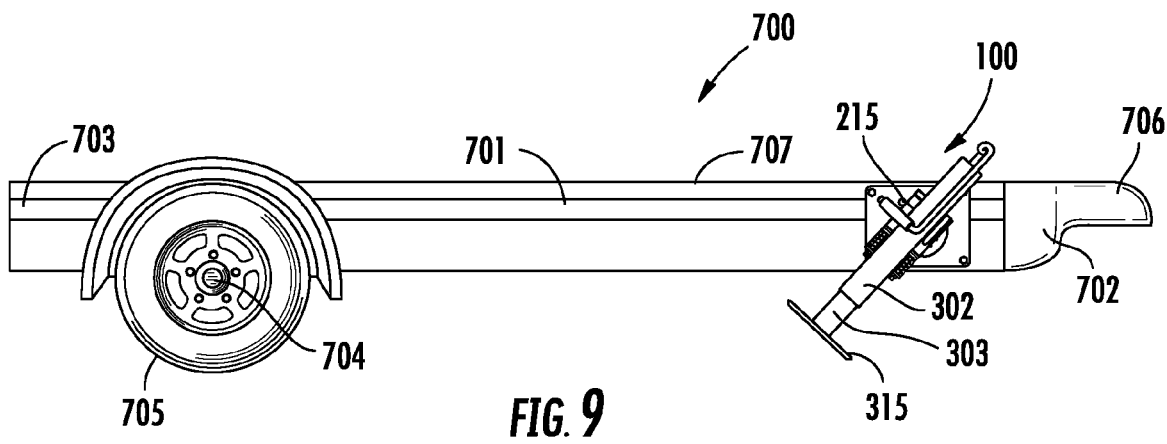
FIG. 9 is a side elevation view of a trailer including a rotational breakaway trailer jack assembly according to the embodiment of FIG. 1 installed thereon, in which the jack assembly is rotated to a non-vertical position between the vertical position of FIG. 8 and a horizontal position shown in FIG. 10.
Figure 10:
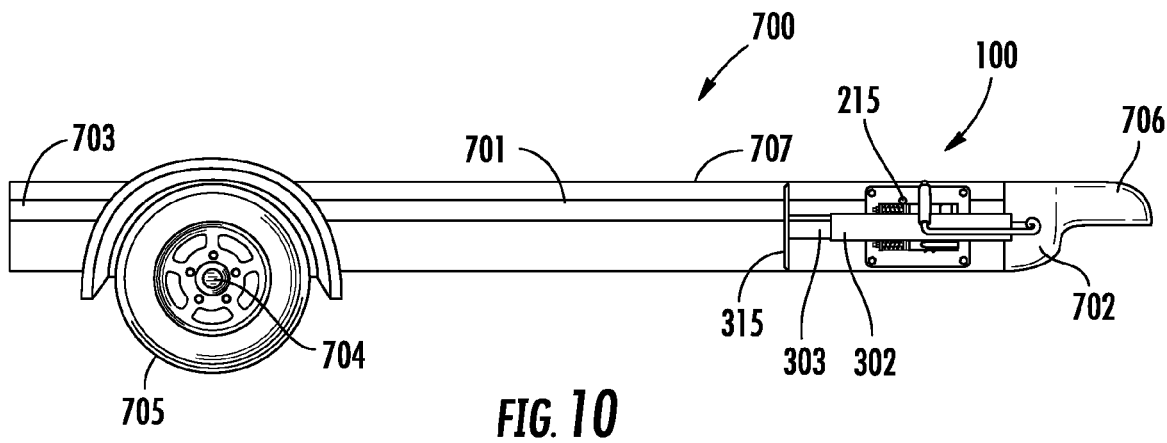
FIG. 10 is a side elevation view of a trailer including a rotational breakaway trailer jack assembly according to the embodiment of FIG. 1 installed thereon, in which the jack assembly is rotated to a horizontal position.

As illustrated in FIGS. 8-10, the jack assembly 100 is shown attached to a trailer 700. The trailer 700 may be of any suitable size and preferably has a support surface 707 and an arrangement or structure for carrying a load. In one or more embodiments, the trailer 700 may include a trailer frame 701 having a front portion 702 and a rear portion 703. A wheel 705 may be attached to the trailer frame 701 by an axle 704. A hitch 706 for connecting to a towing vehicle may also be attached to the trailer frame 701. The jack assembly 100 may be arranged so as to be positioned and attached to the trailer frame 701 toward the front portion 702 of the trailer 700. However, it is contemplated in one or more examples of embodiments that jack assembly 100 may be used in any suitable location on the trailer 700. Additionally, in one or more examples of embodiments, the trailer 700 may also include more than one wheel 705 operably attached to the trailer 700 which may be independent or interconnected by one or more axles 704.

In operation and use of the jack assembly 100 of one or more examples of embodiments, the jack assembly 100 may be provided in a vertical position, as best illustrated in FIGS. 1, 3 and 4. Upon the application of force or weight, downward force placed upon the jack assembly 100 is increased. As a result, the jack assembly 100 moves from a first position, as illustrated in FIGS. 1, 3 and 4, to a second position, as illustrated in FIGS. 5-7. The application of the force or weight (which can be, for example, a minimum amount of force or weight, such as the tongue load of the trailer 700, or the weight of the trailer 700 and/or load) causes activation of the force or weight activated locking assembly 400. In particular, the pin receptor 225 is forced downward, such that the pin 251 moves from the upper stop 226 and is received within the locking valley or recess or positive stop 232 portion of the pin receptor 225. This may be facilitated by the simultaneous compression of the first and second biasing attachment device or fasteners 601, 605 and longitudinal movement of the pivot mount 220 from the bottom or second arcuate end 248 to the top or first arcuate end 247 of the mounting wall 241 aperture 246. (Compare FIGS. 1, 3 and 4 to FIGS. 5-7). In this position, the jack assembly 100 is locked in a vertical position.

Removal of force or weight (which can be, for example, removal of the tongue load of the trailer 700 or a load from the trailer 700) will result in a decrease in the downward force placed upon the jack assembly 100. As a result, the jack assembly moves from the second, locked position, as illustrated in FIGS. 5-7, to the first, unlocked position, as illustrated in FIGS. 1, 3 and 4, deactivating or unlocking the force or weight activated locking assembly 400. In particular, the pin receptor 225 moves upward, such that the pin 251 moves out and away from the locking valley or recess or positive stop 232 to the upper stop 226 of the pin receptor 225. Simultaneously, the pivot mount 220 moves upward from the bottom or second arcuate end 248 to the top or first arcuate end 247 of the aperture 246 of the 240 mounting wall 241. The movement of the pivot mount 220 is facilitated by the first and second biasing attachment device or fasteners 601, 605, which bias the spring push plate 275 away from the spring plate arm 265 of the mounting plate 240. In this position, the jack assembly 100 is unlocked in a vertical position.

The force or weight activated locking assembly 400 may also be activated by manipulation of the jack arm 310 of the adjustable support assembly or jack 300. Specifically, with the jack assembly 100 provided in a vertical position, rotation or pivotal movement of the jack arm 310 may first cause the telescoping assembly 301 to increase in length and enable the ground engaging member 315 to contact the ground. (Compare telescoping assembly 301 in FIGS. 3 and 4 to telescoping assembly 301 in FIGS. 5-7). Movement continues by rotation or pivotal movement of the jack arm 310, lifting the attached trailer 700. The force applied causes the spring push plate 275 to move against the force of the first and second biasing member or resilient elements 603, 607 mounted below the first and second biasing mounts 284, 288, and above the first and second spring support portions 266, 270 of the spring plate arm 265 of the mounting plate 240 attached to the adjustable support assembly or jack 300. Simultaneously, the pivot mount 220 moves from the top or first arcuate end 247 to the bottom or second arcuate end 248 of the aperture 246 of the mounting plate 240 mounting wall 241. Application of additional force moves the pin 251 from the upper stop 226 of the pin receptor 225 into the locking valley or recess or positive stop 232 of the pin receptor 225. (Again compare FIGS. 1, 3 and 4 to FIGS. 5-7). In this position, the jack assembly 100 is also locked in a vertical position.

Rotation or pivotal movement of the jack arm 310 in the opposite direction causes the telescoping assembly 301 to decrease in length, first causing the pin 251 to move down and away from the locking valley or recess or positive stop 232 to the upper stop 226 of the pin receptor 225. Continued rotation or pivotal movement of the jack arm 310 enables the first and second biasing member or resilient elements 603, 607 to bias the spring push plate 275 away from the mounting plate 240, moving the pivot mount 220 from the bottom or second arcuate end 248 to the top or first arcuate end 247 of the aperture 246 of the mounting plate 240 mounting wall 241. In this position, the jack assembly 100 is unlocked in a vertical position. Further rotation or pivotal movement of the jack arm 310 further decreases the telescoping assembly 301 length, eventually lifting the ground engaging member 315 off the ground (not shown).

In the unlocked position, the pivot assembly 500 is capable of rotational or pivotal movement by the user, or rotational or pivotal movement upon contact with an obstruction. More specifically, the back plate 210 of FIGS. 8-10 may be fixedly or rigidly attached to the trailer. The mounting plate 240, which may carry the adjustable support assembly or jack 300 and the spring push plate 275, rotates or pivots about the pivot mount 220 of the back plate 210, resulting in the rotation of the adjustable support assembly or jack 300. Rotational or pivotal movement of the pivot assembly 500 may be selectively limited by the engagement of the pin 251 with the pin receptor 225. In one or more examples of embodiments, rotational or pivotal movement of the pivot assembly 500 may be limited by the stop or block or extrusion 215. Further, in one or more examples of embodiments, the pivot assembly 500 and jack assembly 100, are capable of movement relative to the trailer about the pivot mount 220 absent the back plate 210.

Figure 14:
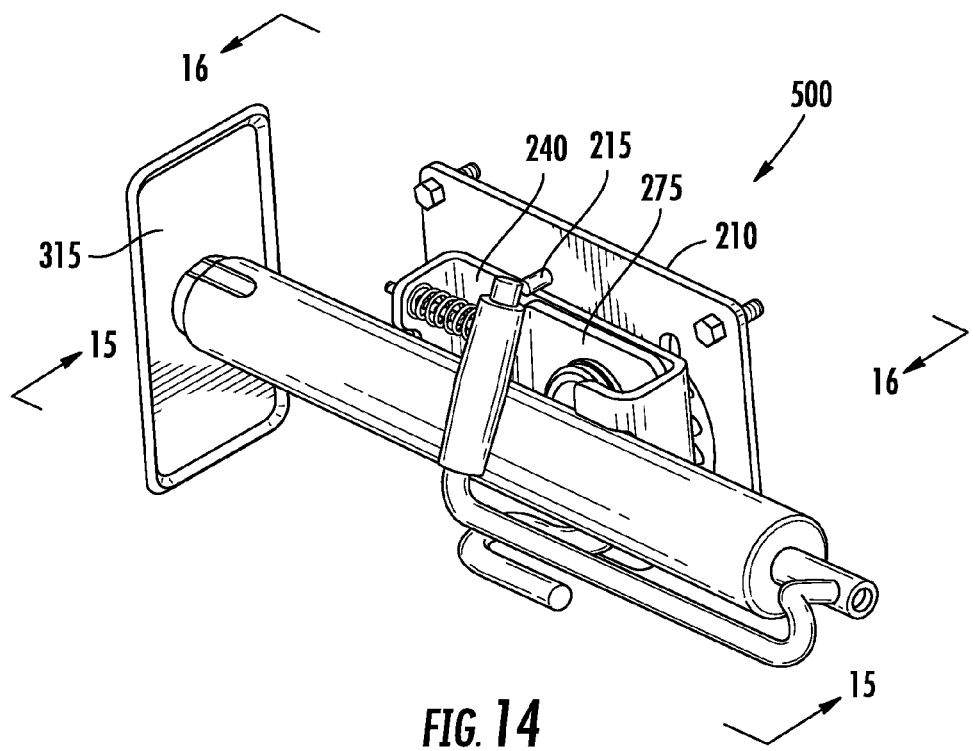
FIG. 14 is an isometric view of a rotational breakaway trailer jack assembly according to the embodiment of FIG. 1, showing the jack rotated in a horizontal storage position.
Figure 15:
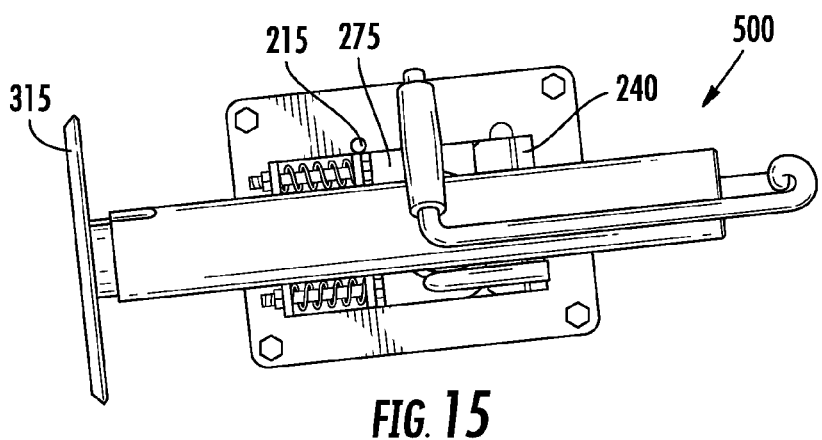
FIG. 15 is an elevation view of the rotational breakaway trailer jack assembly of FIG. 14 taken along line 15-15 of FIG. 14.
Figure 16:
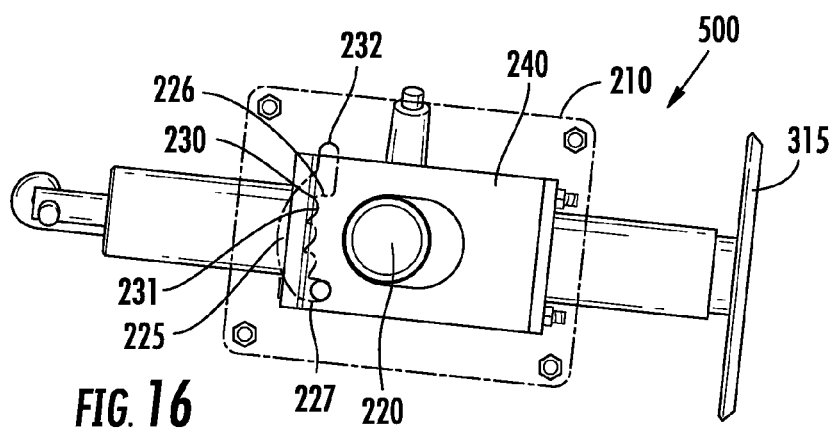
FIG. 16 is an elevation view of the rotational breakaway trailer jack assembly of FIG. 14 taken along line 16-16 of FIG. 14.

In one or more examples of embodiments, the pivot assembly 500 may be operably associated with the ratcheted pin receptor 225 in the back plate 210. Therefore, when no force or weight is applied to the trailer 700, the pin 251 may move along the ratcheted pin receptor 225 from the upper stop 226 to the lower stop 227 of the pin receptor 225. An amount of rotational or pivotal force may be applied to the pivot assembly 500 to overcome the first protrusion 230 within the pin receptor 225, seating the pin 251 into an adjacent valley 231. When the pin receptor 225 has more than one protrusion 230 and valley 231, further rotational force may be applied to the pivot assembly 500 to overcome a second protrusion 230, seating the pin 251 in a second valley 231, a third protrusion 230 to seat in a third valley 231, continuing until the pin 251 reaches the lower stop 227 of the pin receptor 225, as shown in FIGS. 14-16. Any number of protrusions 230 and valleys 231 would be acceptable for purposes of the present invention. Additionally, as the pin receptor 225 may be arcuate in shape, the movement of the pin 251 in the pin receptor 225 between the inner wall 228 and outer wall 229 follows the rotational or pivotal movement of the pivot assembly 500 about the pivot mount 220. In one or more examples of embodiments, rotational force may be applied to the pivot assembly 500 until the pivot assembly 500 comes into contact with stop or block or extrusion 215. Stop or block or extrusion 215 acts to restrict further rotation of pivot assembly 500, as shown in FIGS. 10, 14 and 15. Further, in one or more examples of embodiments, a combination of stop or block or extrusion 215 and lower stop 227 of the pin receptor 225 may be used to restrict rotational movement of pivot assembly 500.

Accordingly, the pivot assembly 500 may be manually operated by applying sufficient rotational or pivotal force to overcome the resistance of the first ratchet of the pin receptor 225 to move the pivot assembly 500, and specifically the adjustable support assembly or jack 300, from a vertical position shown in FIG. 8 to a horizontal storage position shown in FIGS. 10. Alternatively, the pin 251 may be slid away or disengaged from the pin receptor 225 by applying a force on the handle 262 away from the pin receptor 225 in the generally perpendicular axis 238 (shown in FIG. 2), applying an amount of rotational force to rotate or pivot the pivot assembly 500 about the pivot or rotational axis 224 (shown in FIGS. 12 and 13) to a non-vertical or horizontal position, and then reinserting or reengaging the pin 251 with the pin receptor 225 by removing the force on the handle 262. When the pin 251 is engaged in the lower stop 227, the pivot assembly 500, and specifically the adjustable support assembly or jack 300, is oriented in a substantially horizontal position, illustrated in FIGS. 10 and 14-16. In other examples of embodiments, the stop or block or extrusion 215 may restrict rotational or pivotal movement of pivot assembly 500 by contacting a portion of pivot assembly 500, for example the second side portion 259 of mounting plate 240, as shown in FIGS. 14 and 15. To move the adjustable support assembly or jack 300 back to the vertical or longitudinal position, the pin 251 is removed or slid away or disengaged from the pin receptor 225 by applying a force on the handle 262 away from the pin receptor 225 in the generally perpendicular axis 238, applying an amount of rotational force to rotate or pivot the pivot assembly 500 about the pivot or rotational axis 224 from a non-vertical or horizontal position to a vertical or longitudinal position, and reinserting or reengaging the pin 251 with the pin receptor 225 by removing the force on the handle 262 following rotation. Removal, sliding away, or disengagement of the pin 251 from the pin receptor 225 generally permits the free or unrestrained rotation or pivotal movement of the pivot assembly 500, and specifically the mounting plate 240, spring push plate 275 and adjustable support assembly or jack 300, about the pivot mount 220. In other examples of embodiments, the pivot assembly 500 may be restricted from rotation or pivotal movement upon removal, sliding away, or disengagement of the pin 251 from the pin receptor 225 by the stop or block or extrusion 215.

In addition, in the unlocked position the jack assembly 100 is provided with a breakaway arrangement. Upon encountering an obstruction while driving, such as when the user leaves the adjustable support assembly or jack 300 of the jack assembly 100 in a vertical or longitudinal position and the jack assembly 100 strikes an obstruction, the pivot assembly 500 will break away from the vertical or longitudinal position, rotating to a second non-vertical position, as illustrated in FIGS. 9 and 11-13, raising the ground engaging member 315 of the adjustable support assembly or jack 300 away from the obstruction. As illustrated in FIGS. 1, 3 and 4, the jack assembly 100, in the unlocked position absent the application of downward force or weight, or support by the adjustable support assembly or jack 300, carries the pin at the upper stop 226 of the pin receptor 225. As previously described, an amount of force may be applied to the jack assembly 100, and specifically, rotational or pivotal force may be applied such that it forces the rotational or pivotal movement of the pivot assembly 500. Force may be applied by an obstruction such as, but not limited to a curb, rock, railroad and anything capable of providing resistance. Upon reaching a predetermined threshold of force, the resistance caused by the first protrusion 230 in the ratcheted pin receptor 225 is overcome and the pin 251 moves into the first valley 231 while simultaneously rotating the pivot assembly 500, and specifically the mounting plate 240, spring push plate 275 and adjustable support assembly or jack 300 about the pivot mount 220. As illustrated in FIGS. 11-13 and 14-16, continued or additional application of rotational or pivotal force may be applied to the pivot assembly 500 to overcome the second, third, and additional protrusions 230 in the pin receptor 225, thereby continuing the rotational or pivotal movement, moving pin 251 into successive valleys 231.

Figure 11:
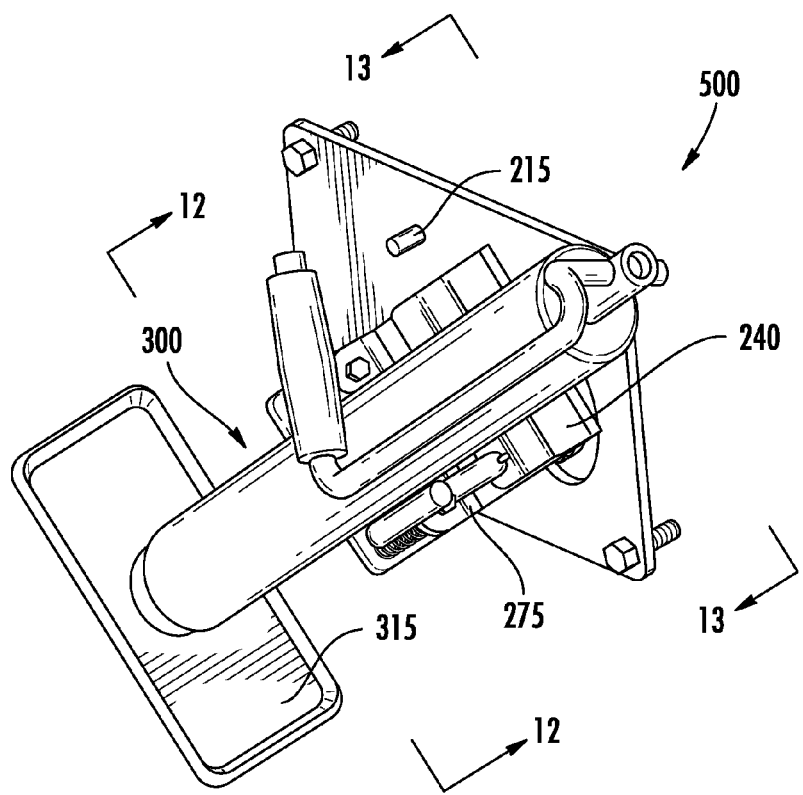
FIG. 11 is an isometric view of a rotational breakaway trailer jack assembly according to the embodiment of FIG. 1, showing the jack rotated to a midpoint between its vertical position and its horizontal position.

As illustrated in FIG. 9, the jack assembly 100 is preferably arranged on the trailer 700 to breakaway upon encountering an obstruction while the trailer and corresponding tow vehicle are driving forward, avoiding damage to the trailer 700 and jack assembly 100. As shown in FIGS. 11-13, the protrusions 230 and valleys 231 forming ratchets of the pin receptor 225 retain or trap the pin 251, retaining the pivot assembly 500, and specifically the mounting plate 240, spring push plate 275 and adjustable support assembly or jack 300, in this non-vertical or "out-of-the-way" position. While contact by an obstruction or application of force with the second end 306 of the adjustable support assembly or jack 300 is described, alternative contact points are contemplated by the present invention. Likewise, alternative directions of movement of the trailer 700 which facilitate the breakaway of the jack assembly 100 are contemplated.

The rotational breakaway trailer jack assembly described herein has several advantages. For instance, the user may easily pivot the jack assembly 100 to a storage position out of the way and unlikely to encounter obstructions by simply applying a rotational force to rotate or pivot the pivot assembly 500. Likewise, when the jack assembly 100 is positioned vertically or in a longitudinal position, it is automatically locked against pivotal movement simply by the force or weight of the load bearing upon the trailer 700. Additionally, when the trailer 700 is attached to a tow vehicle and the user fails to move the jack assembly 100 to a storage position, the jack assembly 100 will not shear off, be damaged or damage the trailer 700 upon contact with an obstruction, because the pivot assembly 500 will rotate or pivot up and out of the way of the obstruction, into a non-vertical position, upon contact with the obstruction. The pivot assembly 500, and specifically the mounting plate 240, spring push plate 275 and adjustable support assembly or jack 300, will further remain in the non-vertical position so as to not freely swing around below the trailer 700 while in motion.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to one or more examples of embodiments outlined above, various alternatives, modifications, variations, improvements and/or substantial equivalents, whether known or that are or may be presently foreseen, may become apparent to those having at least ordinary skill in the art. Accordingly, the one or more examples of embodiments of the invention, as set forth above, are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A jack assembly to support a portion of a trailer, the jack assembly comprising:
    a pivot mount including a pivot axis;
    a mounting plate rotatable about the pivot axis;
    a support assembly carried by the mounting plate;
    a pin receptor having a first portion and a second portion and further comprising at least one protrusion and at least one valley to form a ratcheted pin receptor, the pin receptor forming an arcuate shape;
    a locking pin carried by the mounting plate and engagable with the pin receptor, the locking pin adapted to move from the first portion to the second portion of the pin receptor upon the application of rotational force.

2. The jack assembly of claim 1, wherein the support assembly comprises a telescoping assembly.

3. The jack assembly of claim 2, wherein the telescoping assembly further comprises:
    a first end;
    a second end;
    a control assembly in communication with the first end of the telescoping assembly for telescopic adjustment of the telescoping assembly; and
    a ground engaging member in communication with the second end of the telescoping assembly.

4. The jack assembly of claim 1, wherein the locking pin is slidably connected with the mounting plate.

5. The jack assembly of claim 1, wherein the mounting plate further comprises an aperture and the aperture rotatably receives the pivot mount.

6. The jack assembly of claim 1, wherein the jack assembly is in communication with a portion of a trailer.

7. A jack assembly to support a portion of a trailer, the jack assembly comprising:
    a pivot mount including a pivot axis;
    a mounting plate rotatable about the pivot axis;
    a support assembly carried by the mounting plate;
    a pin receptor having a first portion and a second portion;
    a locking pin carried by the mounting plate and engagable with the pin receptor, the locking pin adapted to move from the first portion to the second portion of the pin receptor upon the application of rotational force; and
    a spring push plate having an aperture, the aperture in communication with the pivot mount.

8. The jack assembly of claim 7, wherein the aperture of the mounting plate rotatably receives the pivot mount and the aperture of the spring push plate rotatably receives the pivot mount.

9. The jack assembly of claim 8, wherein the mounting plate is operably connected to the spring push plate by a biasing member.

10. The jack assembly of claim 9, further comprising:
    the biasing member comprising:
        a fastener having a first end and a second end,
        a resilient element having a first end and a second end, and
        a mating element;
    the mounting plate further comprising:
        a first wall and a second wall,
        the first wall arranged in a plane generally perpendicular to the second wall,
        the first wall having the aperture which rotatably receives the pivot mount,
        the second wall having a first side, a second side, and an orifice;
    the spring push plate further comprising:
        a first wall and a second wall, the first wall arranged in a plane generally perpendicular to the second wall, the first wall having the aperture which rotatably receives the pivot mount, the second wall having a first side, a second side, and an orifice;

the fastener is operably received by the orifice of the second wall of the spring push plate and further the fastener is operably received by the orifice of the second wall of the mounting plate, wherein the first end of the fastener is in contact with the first side of the second wall of the spring push plate, the second end of the fastener is operably connected to the mating element, the mating element in contact with the second side of the second wall of the mounting plate; and the resilient element is operably connected to the fastener, the first end of the resilient element is in contact with the second side of the second wall of the spring push plate, and the second end of the resilient element is in contact with the first side of the second wall of the mounting plate.

11. A support assembly for supporting a portion of a trailer, the support assembly comprising:

a force activated locking assembly comprising:
- a pin receptor having an upper stop, a lower stop, and a locking recess;
- a mounting plate comprising a first wall and a second wall, the first wall arranged in a plane generally perpendicular to the second wall;
- a spring push plate in communication with the mounting plate by a biasing member, the spring push plate comprising a first wall and a second wall, the first wall arranged in a plane generally perpendicular to the second wall;
- the second wall of the mounting plate connected to the second wall of the spring push plate by a biasing member;
- a pin in communication with the mounting plate and removably received by the pin receptor; and
- a jack assembly in communication with the mounting plate.

12. The support assembly of claim 11, wherein the force activated locking assembly further comprises:

the first wall of the mounting plate further comprising a generally oblong aperture;

the first wall of the spring push plate further comprising an aperture;

a pivot mount rotatably received by the mounting plate aperture;

the pivot mount further rotatably received by the spring push plate aperture; and the pin is slidably connected to the mounting plate.

13. The support assembly of claim 11, wherein the support assembly is in communication with a portion of a trailer.

14. A rotatable, force activated locking jack assembly, the jack assembly comprising:

a mounting assembly comprising:
- a back plate comprising a pivot mount and a ratcheted pin receptor;
- a mounting plate comprising a first wall and a second wall, the first wall having a generally oblong aperture, the first wall arranged in a plane generally perpendicular to the second wall;
- a spring push plate comprising a first wall and a second wall, the first wall having an aperture, the first wall arranged in a plane generally perpendicular to the second wall;
- a biasing member in communication with the second wall of the mounting plate, and further in communication with the second wall of the spring push plate, operably connecting the mounting plate and the spring push plate;

an adjustable support assembly comprising:
- a telescoping assembly connected to at least one of the mounting plate and the spring push plate;
- a pin slidably connected to the mounting plate;

a pivot assembly comprising:
- the first wall generally oblong aperture of the mounting plate is rotatably connected to the pivot mount;
- the first wall aperture of the spring push plate is rotatably connected to the pivot mount; and
- the pin is removably received by the ratcheted pin receptor.

15. The rotatable, force activated locking jack assembly of claim 14, the jack assembly further comprising:

the ratcheted pin receptor comprising:
- an inner arcuate wall further comprising at least one valley and one protrusion;
- an outer arcuate wall;
- an upper stop having an upwardly extending locking valley; and
- a lower stop;

the first wall generally oblong aperture of the mounting plate rotatably receives the pivot mount;

the first wall aperture of the spring push plate rotatably receives the pivot mount; and the telescoping assembly further comprising:
- a first end;
- a second end;
- a control assembly in communication with the first end of the telescoping assembly for telescopically adjusting the telescoping assembly; and
- a ground engaging member in communication with the second end of the telescoping assembly.

16. The rotatable, force activated locking jack assembly of claim 14, wherein the jack assembly is connected to a portion of a trailer.

* * * * *